No. 611,685. Patented Oct. 4, 1898.
E. & H. HICKS.
TREE MOVING APPARATUS.
(Application filed Jan. 20, 1898.)
(No Model.) 4 Sheets—Sheet 1.

Witnesses
Edward Rowland
D. Solis Ritterband

Edward Hicks } Inventors.
Henry Hicks
By their Attorney Phillips Abbott

No. 611,685. Patented Oct. 4, 1898.
E. & H. HICKS.
TREE MOVING APPARATUS.
(Application filed Jan. 20, 1898.)
(No Model.) 4 Sheets—Sheet 2.
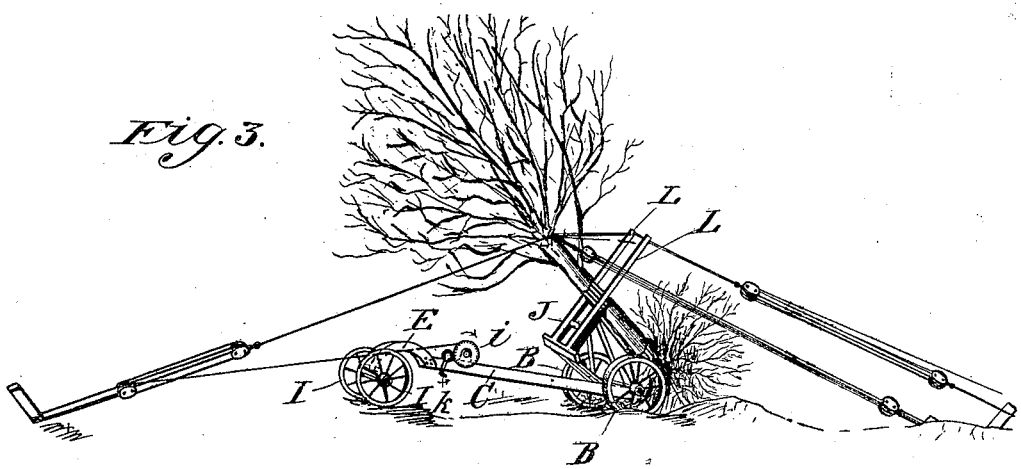
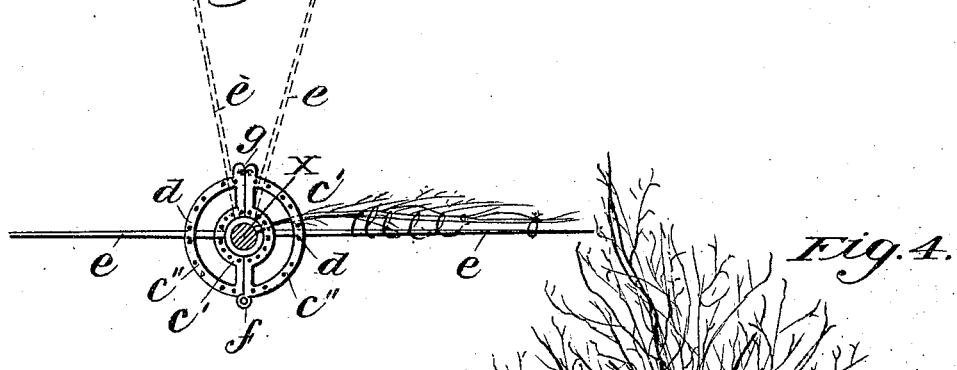
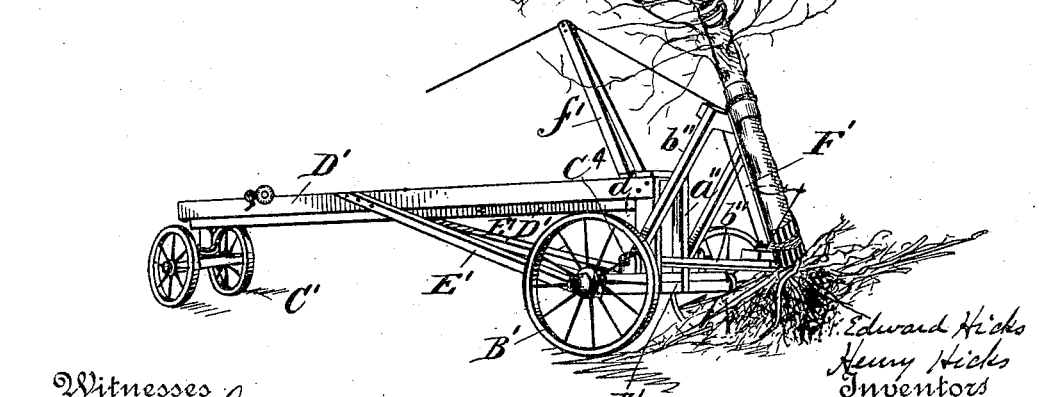
Witnesses
Edward C. Rowland
H. Solis Ritterband
Edward Hicks
Henry Hicks
Inventors
By their Attorney Phillips Abbott.

No. 611,685. Patented Oct. 4, 1898.
E. & H. HICKS.
TREE MOVING APPARATUS.
(Application filed Jan. 20, 1898.)
(No Model.) 4 Sheets—Sheet 3.

WITNESSES:
Edward E. Rowland
D. Solis Ritterband

Edward Hicks
Henry Hicks
INVENTORS

BY Phillips Abbott
their ATTORNEY

THE NORRIS PETERS CO., PHOTO-LITHO., WASHINGTON, D. C.

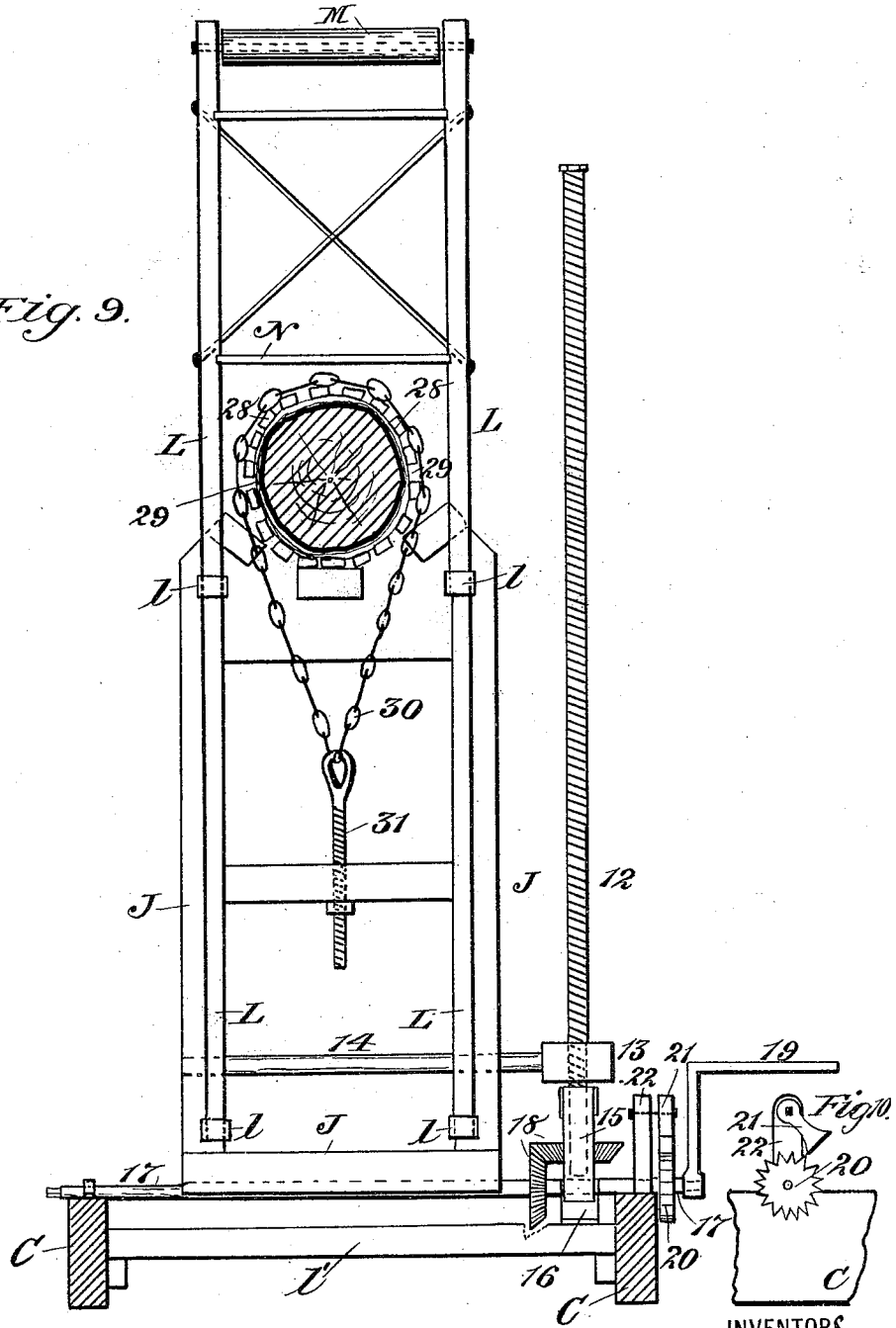

UNITED STATES PATENT OFFICE.

EDWARD HICKS AND HENRY HICKS, OF WESTBURY, NEW YORK.

TREE-MOVING APPARATUS.

SPECIFICATION forming part of Letters Patent No. 611,685, dated October 4, 1898.

Application filed January 20, 1898. Serial No. 667,406. (No model.)

*To all whom it may concern:*

Be it known that we, EDWARD HICKS and HENRY HICKS, citizens of the United States, and residents of Westbury, in the county of Queens and State of New York, have invented certain new and useful Improvements in Tree-Moving Apparatus, of which the following is a specification.

Our invention relates to an improved apparatus for moving trees. Heretofore tree-moving devices of various sorts have been used, several of them being satisfactory for moving small trees, but none, so far as we are aware, (and we have had considerable experience with various forms of such apparatus,) are adapted to moving trees of any considerable size—say from ten to twenty-four inches in diameter or thereabout—because such prior apparatus was not adapted to safely handle such large trees, and also because sufficient roots or earth-ball could not be transported with them, and, if not, the life or at least the thrift of the trees is doubtful.

By our apparatus we move trees as large as two feet and more in diameter at the butt, and can transport with such trees a ball of earth, say, from eight to ten feet in diameter and a spread of roots from thirty to thirty-five feet in diameter.

Figure 1:
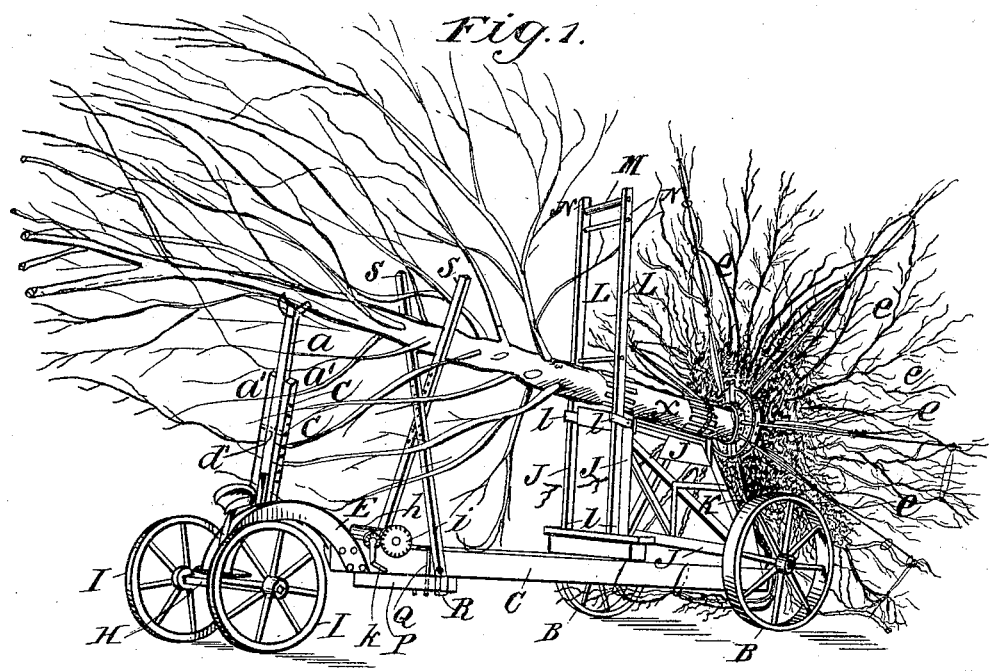
Figure 2:
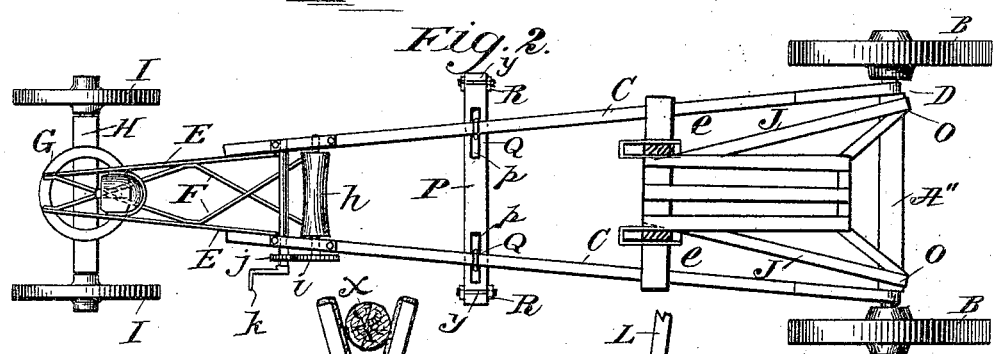
Figures 5, 6:
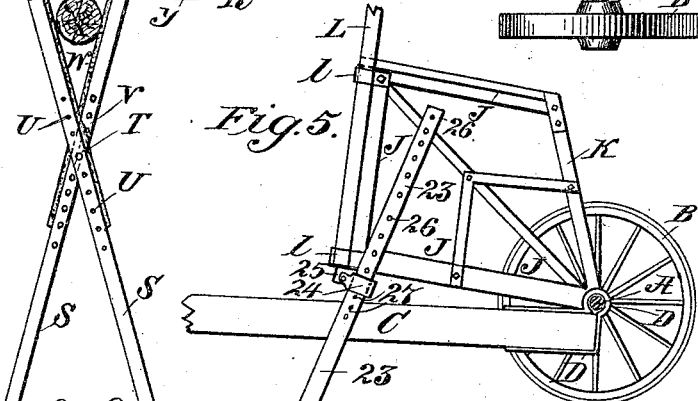
Figure 8:
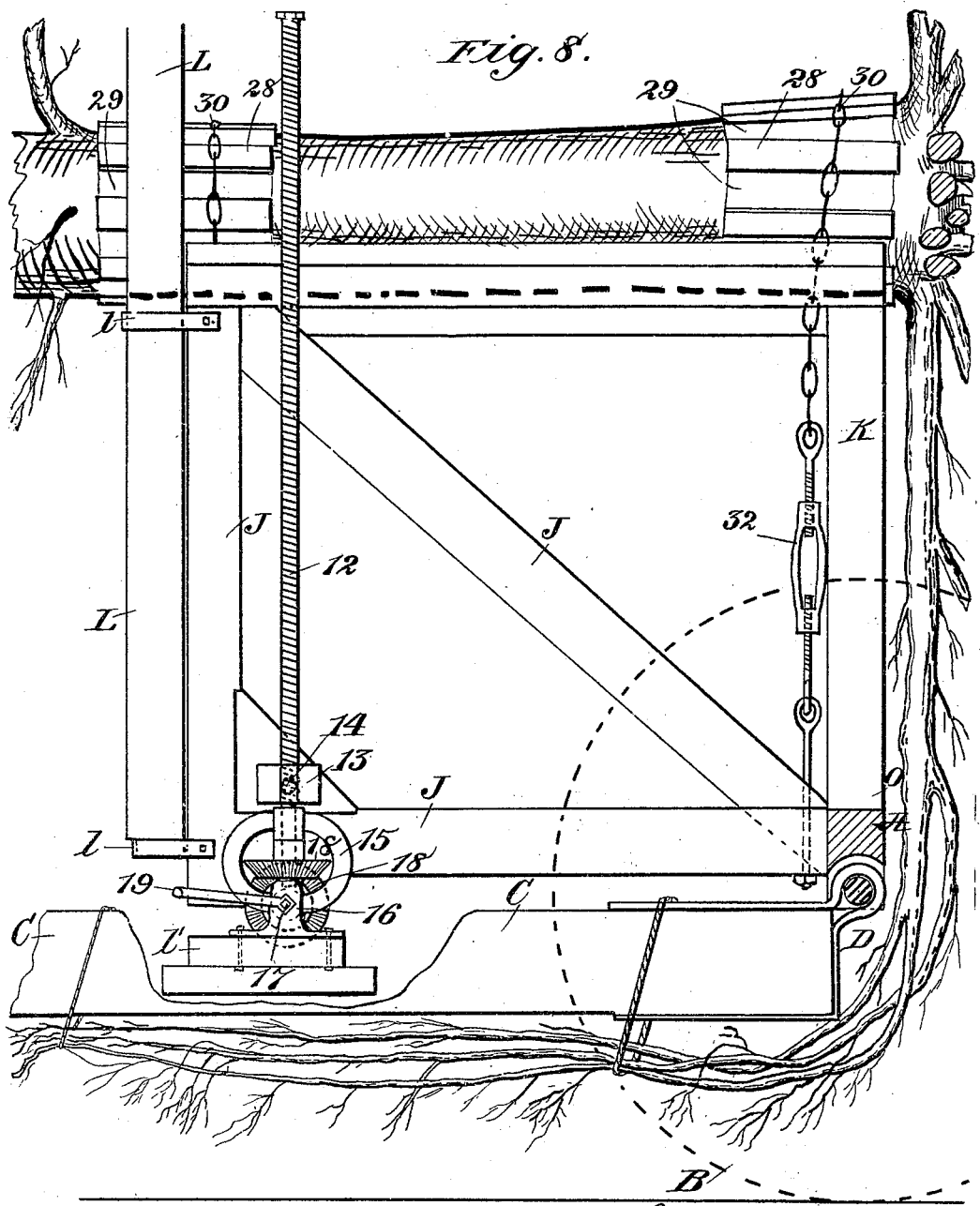

Referring to the drawings hereof, Figure 1 illustrates a perspective of one form of the apparatus with a tree upon it. Fig. 2 illustrates a plan view of that which is shown in Fig. 1. Fig. 3 illustrates the apparatus in the process of loading a tree upon it. Fig. 4 illustrates a method of transporting a tree in practically a vertical position. Fig. 5 illustrates a detail of one form of pivoted cradle. Fig. 6 illustrates a detail of the supporting cross-frame. Fig. 7 illustrates a detail of the root-supporting devices. Fig. 8 illustrates a side elevation of the cradle with the trunk of a tree upon it, showing one form of screw-hoist and the method in which long roots may be supported upon the perches of the machine. Fig. 9 illustrates a front view of that which is shown in Fig. 8. Fig. 10 illustrates a detail of the double-acting ratchet and pawl.

The apparatus, generally stated, comprises front wheels and back wheels connected by a perch, which has a gooseneck at the front wheels, under which they may be cramped. The rear ends of the perch are pivoted to the rear axle. Rigidly attached to this rear axle there is a cradle, which is adapted to tilt with it as an axis and to which the tree, which has previously been excavated, is lashed and by which it may be tilted over, suitable traction devices being provided, so that the cradle in its oscillatory movement will lift the roots and earth-ball free from the ground, lifting them into the air ten to fifteen or more feet, as the case may be. The front portion or top of the tree is supported upon suitable bracing devices, which will be described hereinafter.

The apparatus is also provided with a screw-hoist and windlass to aid in manipulating the tree, both for its removal from its location and its deposition in its new site, and there are also certain safety appliances provided, which will be hereinafter described.

Referring now to the structural features of the apparatus, A is the rear axle.

B B are the rear or large wheels. They are preferably made with very wide tires, as shown.

C C are two side bars which constitute the perch. They may be made of any suitable material, and are pivoted to the rear axles by strap-joints D, (see Figs. 2, 5, and 8,) so that the axle, which is suitably mounted for the purpose, may rotate in these straps. They may, however, be attached to a cross-shaft adjacent to the axle, if preferred.

The gooseneck-frame E, preferably of metal, is bolted to the front ends of the two side bars of the perch, as shown, and it may be braced by cross-braces F. (See Fig. 2.)

G is the fifth-wheel, which is preferably a complete circle, to which the front ends of the gooseneck-frame are attached in any suitable manner.

H is the front axle.

I I are the front wheels; J J J, a frame, which may be of timber or iron, as preferred, constituting the cradle. Its rear part is preferably built upon an incline, as shown best in Fig. 5, so as to allow more space for the roots of the tree and yet bring the load suitably over the rear axle, and the upper part is made in the form of a strong support or trough-like frame, the better to support the tree, upon which its trunk rests.

L L and M form a removable strut to hold up the rear guy or tackle in a manner hereinafter to be described. This strut is fastened to the cradle-frame J by the metallic straps or clevis *ll*. (Shown in Figs. 5 and 8.) The side frame of the cradle slants outwardly, as shown in Fig. 2, so that the lower rear portions thereof O O are near the ends of the rear axle and closely adjacent to the rear ends of the perch, and at this point they are rigidly attached to the upper wooden axle A'', (see Fig. 2,) which rests upon and is clamped to the underlying metal axle, so that this cradle and all its coacting parts may rock with the axle in the boxes of the rear wheels during the loading and unloading of a tree.

P (see Figs. 1, 2, and 6) is a cross-beam fastened by straps Q (see Fig. 6) to the perch-beams C C, as shown, and upon the outer ends of the beam are mounted two bearing-pieces R R, in which are stepped two vertical stay-beams S S, which cross each other, as shown, and at the point of juncture there is a cross-bolt T, which is adapted to be entered into such one of the series of holes used in the beams as desired, so that the angle and also the elevation of the crossing of these beams can be adjusted at pleasure. Their inner faces are preferably lined with cushioning material W, so that the bark upon the tree need not be injured. These bars S S are provided with an eye at their lower ends, through which a bolt or pivot Y passes, which can be readily removed when desired. The cross-beam P, upon which these supports are mounted, may be adjusted laterally and longitudinally of the perch by means of slots *p p*, (see Figs. 6 and 2,) through which the straps Q may slide as desired.

*a* (see Fig. 1) is a strut or what we call "extension-crutch" for the topmost part of the tree. It is supported at its lower end upon the fifth-wheel or other suitable part of the apparatus and at its upper end is bifurcated, as shown, so as to embrace the trunk or other suitable part of the tree for its proper support. In operation it may be suitably lashed in position. We prefer to make this strut adjustable, as shown in Fig. 1, *a* being the central member and *a' a'* two lateral pieces with holes *c* in them, through which a pin *d'* passes, as shown. Any desired elevation of the strut may thus be attained.

In Fig. 7 we show a two-part frame comprising an inner ring *c'* and an exterior ring *c''*, in each of which there is a succession of holes *d d*, in which pins or staple-like devices may be secured, which support lateral arms or poles *e*. The two parts of this frame are hinged together at *f* in any suitable manner and at the opposite ends are provided with a fastening device *g*, whereby its free ends may be secured together, so that being opened it may be placed upon the trunk of a tree close to the roots and the free ends brought together again and fastened, as shown in Figs. 1 and 7. The poles *e* may then be applied to what may be called this "double" collar and supported upon the two rings *c'* and *c''* thereof, and to these poles *e* the roots will be lashed, either during the excavation of the tree or after it has been partially or wholly lifted upon the cradle, and in this manner the roots will be supported, so that the weight of the earth which may cling to them or their own weight, as the case may be, or obstructions which may strike them during transportation will not break them.

*h* is a windlass which may be mounted upon the perch of the apparatus, provided at one end with a gear-wheel *i*, with which meshes a pinion *j*, provided with a crank *k*. By means of this windlass the tackle to draw the tree over upon the cradle may be manipulated.

*l'* is a transverse beam fastened between the perches, upon which is supported a vertically-arranged screw-hoist. (Best seen in Figs. 8, 9, and 10.) It comprises a screw 12, a threaded nut 13, which engages with the screw, a shaft 14, upon which the nut is supported and oscillates, which shaft revolves in bearings on the lower part of the pivoted cradle, a frame 15, which supports the screw and gear-wheels, a box for the shaft and ring-support 16, a shaft 17, beveled gear-wheels 18, and a handle 19, also a ratchet-wheel 20, (see Fig. 10,) which is provided with a reversible double-acting dog 21 and standard 22, which supports the dog.

The above is our preferred construction of screw-hoist; but it is obvious that equivalent mechanism of different construction can be employed, if preferred.

The operation of the screw-hoist is as follows: The turning of the crank of the handle 19 turns the bevel-gears and consequently the screw. This moves the nut and the shaft 14 up or down, depending upon the direction in which the crank is turned, and through them the cradle (and the tree upon it) is tilted in either direction and its movements controlled. The screw also tilts as the cradle rises and falls by the rocking of the ring-support 15 on the shaft 17, which supports it. The ratchet-wheel and double-acting reversible dog will hold the tree stationary in any position, whether the root or top be the heavier.

The shaft 17, upon which the crank is applied, extends transversely from side to side of the machine, and is supported upon bearings upon the perch-beams C C, as shown, and both ends of this shaft are squared or otherwise arranged to receive the crank, so that the screw-hoist may be manipulated from either side of the machine.

During the loading and unloading operation the cradle is rocked upon its axis by means of this screw, manipulated as above suggested, so that the tree is lifted from its former location and deposited in its new resting-place. This screw-hoist will alone manipulate the cradle and the tree upon it, excepting the larger sizes. With them we prefer to supplement the screw-hoist with suitable tackle.

In Fig. 4 we illustrate a modified construction, in which A' is the rear axle; B', the rear wheels; C', the front wheels; D', the perch, formed of two beams the same as before, and E' E' braces which extend from the rear axle to the perch. The perch in this instance is set up suitably above the axle, and at its rear end is connected therewith by a frame $a''\ a''$, and the cradle in this instance is formed of a V-shaped frame $b''\ b''$, which is pivoted at $C^4$ to stanchions on the rear axle. The double or upper portion of the cradle, upon which the tree rests, is shown in this instance at F'. $f'$ is a derrick-like attachment or strut, which may be supported either upon the ground or upon the rear axle, as preferred, to aid in manipulating the tree.

In Fig. 8 we show the manner in which long heavy roots of large trees may be prevented from trailing upon the ground by bending them under the rear axle of the machine and attaching them by ropes to the perch-beams C.

In order to prevent the possibility of the tree falling upon the machine in the event that any part of the tackle or screw-hoist should break or anchorages pull out or other such accident, which would not only destroy the machine and probably the tree, but might also endanger life, we provide a safety device as follows, (see Fig. 5:)

23 is a timber which slides through a ring or sleeve 24, which is pivoted at 25 to a suitable part of the cradle. 26 26 are holes in this timber, and 27 two pins. In operation this ring-clutch slides down on the timber as the tree tilts over upon its cradle and is gradually lowered, and the pins are alternately removed from the holes and replaced lower down as the ring-clutch approaches them. Thus in the event that anything should break the tree could fall no farther than until the ring-clutch should come in contact with the first pin.

In Figs. 8 and 9 we show protecting-slats 28, which are fastened on a padded canvas cushion 29, over which clamping-chains 30 pass to bind the tree to the cradle, the said chains being operated by clamping-screw 31 or turnbuckle 32.

The operation of the apparatus is as follows: The tree is first excavated and preferably somewhat freed from the ground by straining it over in different directions to loosen the bottom roots. The machine is then backed down into the excavation so as to have the proper relation to the trunk of the tree, and the cradle is then tilted backward by the screw-hoist or other means until the trough or upper part of the cradle rests practically against the trunk of the tree. Then in order to protect the bark the cushions with slats preferably are applied to the tree and tied about it. The tree is then firmly lashed to the cradle by the chains above explained. The root-supporting collar, with the radially-extending poles, may be then or previously applied to the tree, the roots, or the larger ones, being lashed to the poles, so as to be lifted and supported by them. Instead of the chain with turnbuckle or screw we sometimes use ropes or chains and an ordinary twisting-stick to lash the tree to the cradle. If the tree be large, suitable anchor-tackle, as shown in Fig. 3, is preferably employed, partly to pull the tree over, and partly to stay it, and partly to prevent its falling too rapidly should the top be heavier than the roots. The staying-tackle will prevent the tree from swinging to the right or left. Sometimes more of these auxiliary devices will be required than at others. It will be noted that the strut-beams L embrace the trunk of the tree and may be removed, if desired, during the adjustment of the apparatus to the trunk and that when in place the roller M at the upper end of this strut affords a bearing (see Fig. 3) for the rear stay-rope or guy-tackle. The trunk of the tree being lashed to the cradle, the front tackle is put in operation in conjunction with the screw-hoist, the other tackle, if used, being properly manipulated to permit the tree to move, and the tree then is pulled over with the cradle, in so doing of course rocking with the cradle upon the rear axle, and is controlled in its movements by the screw-hoist, the safety-beam, and the tackle, (one or more of them, as the case may be,) and it is prevented from swaying laterally and upsetting the machine by the stay-tackle, if such be necessary. By this combined means it is slowly brought into a substantially horizontal position or to such angle as may be desired, and in so doing the trunk of the tree is by reason of the leverage of the cradle lifted several feet into the air, depending upon the height of the cradle, lifting with it into the air such ball of earth as will adhere to the roots and the roots themselves. The roots which will thus be lifted from the ground and which might trail upon it during the movement of the tree may then be bent under the rear axle and fastened to the perch-beams, as shown, and the upwardly and horizontally extending roots will be supported upon the poles, so that they will not by their own weight or the weight of the earth adhering to them break. This apparatus permits a mass of roots from twenty to thirty-five or more feet in diameter to be moved with the tree and in addition a large earth ball adjacent to the trunk. As the top of the tree gradually descends toward the machine the cross-frame S S is properly adjusted, so as to receive the trunk of the tree or one of its principal branches, as the case may be, between its upper V-shaped ends, as shown in Fig. 1, and the forward strut or extension-crutch $a\ a$ is likewise adjusted, and when in horizontal position, or substantially so, all the parts are lashed firmly with ropes, and the top of the tree is likewise preferably closed together somewhat by ropes passed over the branches, drawing them into a more compact compass than in their normal condition, so that during transportation there will not be so much slatting of the branches and not so much liability of their engaging with obstructions. As many horses as are necessary are then attached to the apparatus, either on the pole or to draft-ropes, and the tree is then drawn off to its new location. Sometimes we prefer to move the tree by means of tackle.

On arriving at the new location selected for the tree, where of course an excavation has been previously made, the apparatus is properly backed up to such excavation, tackle being preferably used in so doing, since the load is frequently too heavy for horses to manipulate. Then the lashing being wholly or partly undone, the screw-hoist or other means is employed to tilt the cradle carrying the tree with it back again, so that it (the tree) finally assumes a vertical position in its new location. The screw-hoist and tackle, if necessary, will control the tipping of the tree and will hold it in a substantially vertical position, while the down-growing roots may be properly arranged and the earth packed about them, and finally the tree is permitted to settle into its new resting place in proper position. The trunk is then unlashed from the cradle, all parts of the apparatus are unlashed and removed, and the machine is then drawn away from the tree. The root-supporting frame and its poles are then likewise removed, the roots are straightened out and properly located, and the excavation is then properly filled, the earth being packed about the roots, watered, and fertilized.

The portion of the apparatus shown in Fig. 4 is substantially the same as that already described and need not be specifically referred to.

It will be observed that our apparatus is a heavy substantial machine adapted to handle trees of great weight and large size and that it embodies devices never before employed, so far as we are aware, for manipulating and controlling trees of such great weight.

We do not limit ourselves to the details of construction shown and described, because it will be obvious to those who are familiar with such matters that modifications may be made therein without departing from the essentials of the invention.

We claim—

1. The combination in a tree-mover of a rear axle, a perch pivoted to the rear axle, a cradle rigidly attached to the rear axle, and a strut on the cradle for the purposes set forth.

2. The combination in a tree-mover of a rear axle, a perch pivoted to the rear axle, a cradle on the rear axle, a strut on the cradle, and a roller or bar at the top thereof, for the purposes set forth.

3. The combination in a tree-mover of a rear axle, a perch pivoted to the rear axle, a gooseneck at the front end of the perch, a pair of front wheels adjacent to the gooseneck, a cradle on the rear axle, and a windlass for pulling over the tree, for the purposes set forth.

4. The combination in a tree-mover of a rear axle, a perch connected to the rear axle, a cradle on the rear axle, which oscillates with it, and a screw-hoist for aiding the manipulation of the cradle, for the purposes set forth.

5. The combination in a tree-mover of a rear axle, a perch connected to the rear axle, a cradle on the rear axle which oscillates with it, a screw-hoist for aiding the manipulation of the cradle, and a vertical strut at the front of the cradle adapted to embrace the tree, for the purposes set forth.

6. The combination in a tree-mover of a rear axle, a perch connected to the rear axle, a cradle on the rear axle which oscillates with it, a screw-hoist for aiding the manipulation of the cradle, a vertical strut at the front of the cradle adapted to embrace the tree, and a windlass for aiding in manipulating the tree, for the purposes set forth.

7. The combination in a tree-mover of a rear axle, a perch pivoted to the rear axle, a cradle on the rear axle and cross-beams supported upon the perch for supporting the upper part of the tree, for the purposes set forth.

8. The combination in a tree-mover of a rear axle, a perch pivoted to the rear axle, a cradle on the rear axle, cross-beams supported upon the perch for supporting the upper part of the tree, and cushioning devices on the inner faces of said cross-beams, for the purposes set forth.

9. The combination in a tree-mover of a rear axle, a perch pivoted to the rear axle, a cradle on the rear axle, cross-beams supported upon the perch for supporting the upper part of the tree, and means whereby the height of said cross-beams may be regulated, for the purposes set forth.

10. The combination in a tree-mover of a rear axle, a perch pivoted to the rear axle, a cradle upon the rear axle, cross-beams supported upon the perch for supporting the upper part of the tree, means whereby the height of said cross-beams may be regulated, and a screw-hoist to aid in manipulating the cradle, for the purposes set forth.

11. The combination in a tree-mover of a rear axle, a perch pivoted to the rear axle, a cradle on the rear axle, cross-beams supported upon the perch for supporting the upper part of the tree, means whereby the height of said cross-beams may be regulated, a screw-hoist to aid in manipulating the cradle, and a windlass on the apparatus for manipulating the tackle, for the purposes set forth.

12. In a tree-mover, the combination of a cradle supported upon a rear axle, the portion of the cradle which lies adjacent to the roots being inclined forwardly relative to the axle, for the purposes set forth.

13. In a tree-mover the combination of a cradle supported upon a rear axle, the rear portion of the cradle being set at a forward angle relative to a vertical line, and vertically-disposed strut-beams at the front of the cradle adapted to embrace and guide the trunk of the tree, for the purposes set forth.

14. In a tree-mover, the combination of a cradle pivoted upon the top of an axle, and provided with a screw-hoist to aid in manipulating it, for the purposes set forth.

15. In a tree-mover, the combination of a cradle pivoted upon a rear axle, provided with a screw-hoist to aid in manipulating it, and stay strut-beams at the front of the cradle adapted to embrace the trunk of the tree, for the purposes set forth.

16. In a tree-mover, the combination of a cradle pivoted upon a rear axle, having strut-beams at its forward end, adapted to embrace the tree, upon the upper end of which are rollers or cross-bars, for the purposes set forth.

17. In a tree-mover, the combination of a cradle for the support of the trunk of the tree pivoted upon a rear axle, stay-beams at the front of the cradle having rollers or cross-bars at their upper ends, and an adjustable cross-frame in advance of the cradle, for supporting the top of the tree, for the purposes set forth.

18. In a tree-mover, the combination of front and back wheels connected by a perch, a cradle located upon the axle of the back wheels, vertical crossed beams in front of the cradle supported upon the perch, and an additional strut or extension-crutch for the topmost part of the tree in advance of said cross-frame, for the purposes set forth.

19. In a tree-mover, the combination of front and back wheels connected by a perch, a cradle mounted upon the axle of the rear wheels, the rear side of the cradle being built upon a forward angle relative to a vertical line, a cross-frame supported upon the perch in advance of the cradle, means whereby the altitude of the cross-frame may be adjusted, and an adjustable strut in advance of the cross-frame, for the purposes set forth.

20. In a tree-moving apparatus, the combination of a frame for the support of the upper part of the tree, comprising a pair of vertical beams, and cushioning means for the protection of the bark of the tree upon said beams, for the purposes set forth.

21. In a tree-moving apparatus, the combination of a frame for the support of the upper part of the tree, comprising a pair of vertical beams, cushioning means for the protection of the bark of the tree upon said beams, and means to adjust the altitude of said tree-supporting beams, for the purposes set forth.

22. In a tree-moving apparatus, the combination of a cradle pivoted to the truck or wagon, and a safety device comprising a beam which works through a collar attached to the cradle, and means to regulate the movement of the timber through the clutch, for the purposes set forth.

23. In a tree-moving apparatus, the combination of a root-holder for the support of the roots of trees in transit, comprising a frame which embraces the trunk of the tree, and poles supported by said frame, for the purposes set forth.

24. In a tree-moving apparatus, the combination of a root-supporter for the roots of trees in transit, comprising a frame hinged together, whereby it may be opened to embrace the trunk of the tree, and poles supported upon said frame, for the purposes set forth.

25. In a tree-moving apparatus, the combination of a cradle for the support of the tree, pivoted to the truck, and a screw-hoist operated from the truck, whereby the cradle may be elevated and depressed, for the purposes set forth.

26. In a tree-moving apparatus, the combination of a cradle for the support of the tree, pivoted to the truck, and a screw-hoist operated from the truck whereby the cradle may be elevated and depressed, and a ratchet and pawl to hold the screw-hoist at any desired position, for the purposes set forth.

27. In a tree-moving apparatus, the combination of a cradle for the support of the tree, pivoted to the truck, and a screw-hoist operated from the truck, whereby the cradle may be elevated and depressed, means whereby said screw-hoist may be operated from either side of the truck, and means for locking the hoist at any desired position, for the purposes set forth.

Signed at Westbury, in the county of Queens and State of New York, this 17th day of January, A. D. 1898.

EDWARD HICKS.
      HENRY HICKS.

Witnesses:
 F. TREDWELL,
 WM. E. HAWXHURST.